United States Patent [19]

Doerges et al.

[11] Patent Number: 4,504,449
[45] Date of Patent: Mar. 12, 1985

[54] PROCESS OF REGENERATING ABSORBENT SOLUTIONS FOR SULFUR-CONTAINING GASES

[75] Inventors: Alexander Doerges; Johann Schlauer; Manfred Kriebel; Anton Hude, all of Frankfurt am Main, Fed. Rep. of Germany

[73] Assignee: Metallgesellschaft Aktiengesellschaft, Frankfurt am Main, Fed. Rep. of Germany

[21] Appl. No.: 503,487

[22] Filed: Jun. 13, 1983

[30] Foreign Application Priority Data

Jun. 16, 1982 [DE] Fed. Rep. of Germany ....... 3222588

[51] Int. Cl.³ ............................................. B01D 53/34
[52] U.S. Cl. .................................... 423/228; 423/226; 55/68; 55/73
[58] Field of Search .................... 423/226, 228; 55/68, 55/73

[56] References Cited

U.S. PATENT DOCUMENTS

| | | | |
|---|---|---|---|
| 2,547,278 | 4/1951 | McCartney | 423/228 |
| 4,085,192 | 4/1978 | Van Scoy | 423/228 |
| 4,372,925 | 2/1983 | Cornelisse | 423/228 |
| 4,406,868 | 9/1983 | Carter et al. | 423/228 |
| 4,409,191 | 10/1983 | Osman | 423/228 |

Primary Examiner—Winston A. Douglas
Assistant Examiner—Terryence Chapman
Attorney, Agent, or Firm—Sprung, Horn, Kramer & Woods

[57] ABSTRACT

In a process of regenerating laden absorbent solutions used to desulfurize gases which contain $H_2S$ and $CO_2$ and possibly COS, which solutions contain at least one highly volatile secondary amine in an organic solvent, the laden absorbent solution is flashed and stripped with its own vapor. The overhead vapors from the regenerator, which consists of an indirectly heated plate column, are cooled to approximately ambient temperature. The resulting condensate is separated and fed to the top of the regenerator. The cooled gas is withdrawn. A partial stream of the vapor is withdrawn from the regenerator 1 to 10 plates below the outlet for the overhead vapors and the inlet for the condensate and is cooled to ambient temperature. The resulting condensate is fed to the regenerator 1 to 10 plates above the inlet for the absorbent solution. The remaining gas is fed to a re-absorber, in which it is scrubbed in a counter-current operation with at least one partial stream of the absorbent solution, preferably with the effluent from the desulfurization COS. The exhaust gas is withdrawn from the top of the re-absorber. The absorbent solution drained from the re-absorber is fed to the upper portion of the regenerator. The regenerated absorbent solution is withdrawn and used to desulfurize gases which contain $H_2S$ and $CO_2$ and possibly COS.

13 Claims, 1 Drawing Figure

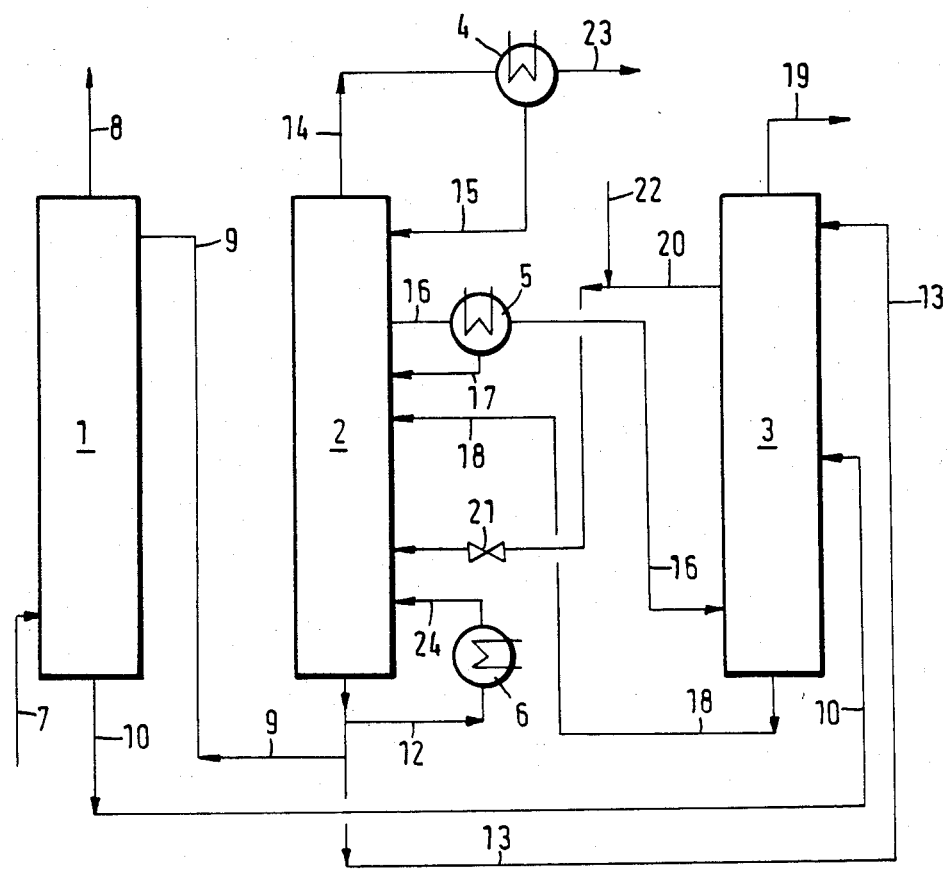

PROCESS OF REGENERATING ABSORBENT SOLUTIONS FOR SULFUR-CONTAINING GASES

BACKGROUND OF THE INVENTION

1. Field of the Invention

This invention relates to a process of regenerating laden absorbent solutions used to desulfurize gases which contain $H_2S$ and $CO_2$ and possibly COS, which solutions contain at least one highly volatile secondary amine in an organic solvent, by flashing and vapor stripping.

If such absorbent solutions which are circulated between absorbing and regenerating stages contain one or more highly volatile secondary amines in an organic solvent, they must be highly regenerated so that the gases to be purified can be desulfurized to a high degree. This is necessary for the protection of sulfur-sensitive catalysts when these gases are used for syntheses.

In the prior art, a considerable consumption of heat, i.e., energy is required for the regeneration (German Patent Specification No. 18 15 137). It is also necessary that the exhaust gases leaving the regenerating means contain the $H_2S$ and COS in the highest possible concentration and that any exhaust gas which contains $CO_2$ contains said toxic sulfur compounds only in low concentrations.

SUMMARY OF INVENTION

It is an object of the invention to provide a process which meets said requirements and minimizes the expenditure of heat and energy required for the regeneration of such absorbent solutions.

This object is accomplished in accordance with the invention in that:

(a) the laden absorbent solution is flashed in a re-absorber and is stripped therein, (b) the overhead vapors from the regenerator, which comprises an indirectly heated plate column, are cooled approximately to the ambient temperature, e.g. 10° to 45° C., the resulting condensate is separated and fed to the top of the regenerator, and the cooled gas is withdrawn, (c) a partial stream of the vapors is withdrawn from the regenerator 1 to 10 plates below the outlet for the overhead vapors and the inlet for the condensate, (d) the partial stream (c) is cooled approximately to the ambient temperature, e.g. 10° to 45° C., the resulting condensate is fed to the regenerator 1 to 10 plates above the inlet for the absorbent solution and the remaining gas is fed to a re-absorber and is scrubbed therein in a countercurrent operation with at least one partial stream of the absorbent solution, whereby to strip the same, preferably with the laden solution obtained by the desulfurization of the gas which contains $H_2S$ and $CO_2$ and possibly COS.

(e) the exhaust gas is withdrawn from the top of the re-absorber, (f) the absorbent solution drained from the re-absorber is fed to the upper portion of the regenerator, (g) regenerated absorbent solution is withdrawn from the regenerator and is used to desulfurize gases which contain $H_2S$ and $CO_2$ and possibly COS.

DESCRIPTION OF SPECIFIC EMBODIMENTS

The procedure according to the invention affords the advantage that the ability of the highly volatile secondary amines to selectively combine with $H_2S$ and COS from $CO_2$-containing gases can be utilized several times. The condensates formed in steps (b) and (d) from the vapors of the regenerating column contain ample quantities of the highly volatile amines, which have preferentially combined with $H_2S$ and COS. As a result, the $H_2S:CO_2$ and $COS:CO_2$ ratios are much higher in said condensates than in the vapors from which the condensates have been formed. When said condensates are then evaporated or stripped, etc., a considerable concentration of the sulfur compounds in the gas phase leaving the regenerator can be achieved. Owing to the combined operation using a re-absorber, a stripped-off mixture which consists of $CO_2$, $H_2S$ and COS and is originally obtained by the desulfurization of a gas which contains $H_2S$, COS and $CO_2$ can easily be divided into a gas stream which consists mainly of $H_2S$ and COS and contains e.g., 80% by volume $H_2S$ and a second exhaust gas stream which consists only of $CO_2$ and has only small contents of $H_2S$ and COS. The $H_2S$ stream can be processed to produce sulfur, e.g., in a Claus process plant. The $CO_2$ exhaust gas can be admixed with the exhaust gas from the Claus process plant. As a total result the conversion of the sulfur compounds to sulfur, i.e., the sulfur yield, can be much improved and the pollution of the environment by the sulfur-containing exhaust gases can be reduced.

According to a preferred further feature of the invention, $CO_2$-containing absorbent solution and/or containing gas is fed to the regenerator below the side outlet (partial stream c)) but above the inlet for the vapors formed by the heating and the heating is controlled in such a manner that the absorbent solution which is drained no longer contains the $CO_2$ which has been fed.

In this manner the heat requirement for the regeneration is reduced. It has been found that the partial pressures of the chemically combined $H_2S$ and/or COS are very considerably increased by the presence of dissolved $CO_2$ in the absorbent solution depending upon the partial pressure of $CO_2$ in the gas phase because the $CO_2$ can displace said sulfur compounds from their chemical bonds. To ensure that said sulfur compounds will be stripped from the solution to a high degree by the regeneration, an adequate concentration of dissolved $CO_2$ is required. This requirement is met by the feeding of $CO_2$ below the side outlet and above the inlet for the vapors formed by the heating. Obviously that fed $CO_2$ must be free of sulfur compounds, particularly of $H_2S$ and COS, or must have only very small contents of sulfur compounds.

In accordance with the invention the $CO_2$-containing absorbent solution and/or the $CO_2$-containing gas is fed at the regenerating temperature under such a $CO_2$ partial pressure that above the feeding level the absorbent solution which has not yet been entirely regenerated contains at least 0.1 mole of $CO_2$ per mole of amine.

This ensures a presence of $CO_2$ in the solution also below the $CO_2$ inlet so that the stripping of the sulfur compounds is promoted. For this purpose it is obviously necessary to know the equilibrium $CO_2$ partial pressures of the absorbent solution.

In accordance with the invention the $CO_2$ required for that fine regeneration is advantageously formed in that at least a small partial stream of the absorbent solution is withdrawn from the upper portion of the re-absorber and fed to the regenerator below the side outlet but above the inlet for the vapors formed by the heating.

That absorbent solution is highly laden with $CO_2$ and has only a small content of $H_2S$ and/or COS and in the regenerator is mixed with the absorbent solution that is to be regenerated so that the $CO_2$ as well as any $H_2S$ and/or COS which is still present is stripped off in the course of the regeneration.

Other suitable solutions or gases which contain $CO_2$ can be used for that purpose, for instance, a partial stream of the absorbent solution from the upper portion of the absorber used to desulfurize the gas. In that case the amount of $CO_2$ which is used should be minimized because the rate of the exhaust gases leaving the plant will otherwise be increased. If a partial stream of the absorbent solution from the upper portion of the re-absorber is used, in accordance with the invention, the exhaust gas rate will not be changed thereby because the $CO_2$ is conducted only in an additional cycle. An increased pollution of the environment will thus be avoided regardless of the rate at which additional $CO_2$ is fed to the regenerator.

It will be particularly desirable to supply the re-absorber at its top with a partial stream of the regenerated absorbent solution from the regenerator. That solution has a particularly small content of sulfur compounds and also in the upper portion of the re-absorber absorbs only a small amount of said compounds but a large amount of $CO_2$ and thereafter is particularly suitable for feeding additional $CO_2$ to the regenerator.

The absorbent solution which has thus been regenerated has such a small content of $H_2S$ and/or COS that in accordance with the invention it can be withdrawn and be used without being cooled for a desulfurization of gases which contain $H_2S$ and $CO_2$ and possibly COS. For this reason, even hot gases can be selectively desulfurized. This is particularly applicable to absorbent solutions which contain diethylamine as a highly volatile secondary amine. This is surprising because it was previously believed that the volatility of such absorbent solutions and the fact that they can be regenerated at boiling temperatures of, e.g., 80° C. precluded their use for an absorption at elevated temperatures of, e.g., 60° C. or even 80° C. But it has surprisingly been found that particularly diethylamine but also other volatile secondary amines have at an elevated temperature, e.g., of 60° C., an even higher selectivity for COS relative to $CO_2$ than at a normal temperature, e.g., of 20° C. whereas the capacity of the absorbent solution to absorb COS is not appreciably decreased by such temperature rise in case of a circulation of absorbent solution at a given rate in relation to a given rate of gas which is to be desulfurized. As a result, a regenerated absorbent solution which is at an elevated temperature because it has not been cooled and can be used to absorb the same quantity of COS and a smaller quantity of $CO_2$, provided that the absorbent solution has been completely regenerated, as can be achieved in accordance with the invention.

In order to remove the last traces of $H_2S$ from the regenerated solution before it is used for a selective desulfurization of gas, the solution may be subjected in accordance with the invention to an oxidizing treatment and for this purpose may be contacted, e.g., with a gas which contains oxygen in a low concentration. The $H_2S$-containing solution greedily absorbs the oxygen so that dissolved elementary sulfur or polysulfides are formed. After that treatment the solution has no longer a measurable $H_2S$ partial pressure and can be used for a perfect desulfurization of gases which contain $H_2S$, COS and $CO_2$.

In accordance with a further preferred feature of the invention the oxygen-containing gas can easily be obtained, for instance, in that air is admixed in a small proportion, e.g., of 0.01 vol.%, to the above-mentioned $CO_2$ which is to be added, so that the $CO_2$ has an oxygen content of 0.002 vol. % $O_2$. As it is sufficient to oxidize only a few milligrams of $H_2S$ per liter of solution, that admixing of air will be sufficient for a complete elimination of hydrogen sulfide from the regenerated solution. Obviously the oxidizing treatment can be effected in a different manner, for instance, in that the solution which still contains $H_2S$ is contacted with nitrogen which still has a small oxygen content, or in that fresh solution is added which has been saturated with atmospheric oxygen.

The air-containing $CO_2$ is desirably fed to the regenerator below the side outlet but above the inlet for the vapors formed by the heating and the heating is controlled in such a manner that the $CO_2$ which has been fed is no longer contained in the drained absorbent solution.

A partial stream of the regenerated absorbent solution is preferably transferred from the regenerator to the top of the re-absorber.

Also in accordance with the invention, regenerated absorbent solution can be withdrawn from the regenerator and without being cooled can be used to desulfurize gases which contain $H_2S$ and $CO_2$ and possibly COS.

The absorbent solutions used within the scope of the invention may contain methanol or another monohydric alcohol as an organic solvent.

Other preferred absorbent solutions may contain N-methyl pyrrolidone, N-methyl ε-caprolactam or another N-alkylated lactam as an organic solvent.

Other suitable absorbent solutions contain one or more alkylated polethylene glycol ethers, such as tetraethylene glycol dimethyl ether, as an organic solvent. Finally, tetrahydrothiphen-1,1-dioxide may be used as an organic solvent in such absorbent solutions.

The highly volatile secondary amines which are used in accordance with the invention consist preferably of diethyl amine, diisopropyl amine, methyl isopropyl amine, ethyl isopropyl amine, dipropyl amine, methyl n-butyl amine, methyl isobutyl amine and methyl sec.-butyl amine alone or in a mixture with each other.

The process according to the invention results in a particularly effective regeneration for the selective removal of $H_2S$ and COS from gases which contain $H_2S$, COS and $CO_2$ and in an increase of the concentration of the sulfur compounds in an exhaust gas which can be processed, e.g., to form elementary sulfur, in a Claus process plant. In some cases, e.g., if the $H_2S:CO_2$ ratio of the gas to be desulfurized is high, lower requirements are to be met regarding the increase of the $H_2S$ concentration in the exhaust gas. In that case, the procedure can be simplified in that the re-absorber is not fed with a stream withdrawn from a side outlet of the regenerator but with a partial stream of the cooled overhead vapor and the withdrawal of a stream from a side outlet is eliminated. That simplified operation is also within the scope of the invention.

BRIEF DESCRIPTION OF DRAWING

The invention is shown diagrammatically and by way of example in the drawing, which contains only the most important units and lines required to carry out the process. Parts and means for conveying, controlling and measuring have been omitted.

The illustrated plant consists of the absorber 1, the regenerator 2, the re-absorber 3, the coolers 4 and 5 and the heater 6. The absorber 1 consists of a plate column, which is fed through line 7 with a compressed gas, which contains $H_2S$ and $CO_2$ and is to be selectively desulfurized. The desulfurized gas is withdrawn through line 8. Absorbent solution is fed to the absorber 1 through line 9 and is drained through the line 10. The rate of the absorbent solution is so selected that all $H_2S$ in the gas is absorbed whereas only part of the $CO_2$ is absorbed. The remaining $CO_2$ is left in the desulfurized gas, which leaves through line 8.

The absorbent solution laden with $H_2S$ and $CO_2$ is regenerated in the regenerator 2, which consists of a plate column and is operated under approximately atmospheric pressure or a slightly increased pressure. Before the solution enters the regenerator 2, it is flashed in the re-absorber 3, which consists of a plate column and is operated under a pressure which is similar to that in the regenerator 2. In the reabsorber, the laden absorbent solution is flashed and used to absorb $H_2S$ from the gas which enters through the line 16. Regenerated solution is fed through line 13 to the upper portion of the re-absorber 3 and is used to remove all $H_2S$ from the gas which is rising in the re-absorber and consists mainly of $CO_2$. Virtually only $CO_2$ escapes through the line 19. As a result, all $H_2S$ which has been fed together with the $CO_2$ through line 16 to the re-absorber 3 has been re-absorbed by the absorbent solution fed through lines 10 and 13 and said $H_2S$ is contained in the solution leaving through line 18. That solution has a much higher $H_2S$ content and a lower $CO_2$ content than the absorbent solution fed through line 10.

High-$H_2S$ absorbent solution is fed through line 18 to the regenerator 2, which is fed in its lower portion with vapors formed in the heater 6 from the absorbent solution circulated through lines 11, 12, and 24. The heater 6 is indirectly steam-heated. The vapors rising in the regenerator 2 strip the gases $H_2S$ and $CO_2$ which are contained in the absorbent solution fed to the regenerator. One (1) to ten (10) plates below the outlet for the overhead vapors and the inlet for the condensate from the line 15, a partial stream of vapors and gases is laterally withdrawn through line 16 and a major part of the vapors is condensed in the cooler 5 by a cooling to ambient temperature. Considerable quantities of $CO_2$ and particularly $H_2S$ are dissolved in the condensate, which is recycled to the regenerator 2 through line 17 and to the regenerator 2 and enters the latter 1 to 10 plates above the inlet for the absorbent solution from line 18. As a result, $H_2S$ and $CO_2$ are stripped from said condensate as well as from the condensate which has been recycled through line 15 and the $H_2S$ content of the vapors is increased. The uncondensed gases of the laterally withdrawn partial stream consist of $H_2S$ and $CO_2$ and are fed through line 16 to the reabsorber 3, in which the $H_2S$ is re-absorbed by the absorbent solution and the re-absorbed $H_2S$ expels part of the $CO_2$ from the solution. It is apparent that the $H_2S$ is circulated through the re-generator 2 and the re-absorber 3 and during such re-circulation is strongly enriched whereas the $CO_2$ fed through line 16 is not re-absorbed in the re-absorber and appears in the outlet 19.

The overhead vapors withdrawn from the regenerator 2 through line 14 are cooled in the cooler 4 to approximately ambient temperature. The resulting condensate is separated and is fed through line 15 to the top of the regenerator. The cooled gas is withdrawn through line 23. The lower the rate at which gas is withdrawn through line 23, the higher will be the $H_2S$ content of that gas, e.g., in excess of 80 vol.%. That gas can be processed in a Claus process plant to form elementary sulfur.

In order to lower the heat requirement of the heater 6 and to further decrease the $H_2S$ content of the desulfurized gas leaving the absorber in line 8, the valve 21 in line 20 leading from the upper portion of the re-absorber 3 to the regenerator 2 can be opened so that $CO_2$-containing absorbent solution and/or $CO_2$-containing gas at the required rate and/or under the required $CO_2$ partial pressure can be fed to the regenerator 2 below the side outlet 16 but above the inlet 24 for the vapors generated by the heating. In this way, $H_2S$ can be expelled from the solution to be regenerated so that the regeneration can be completed.

Any residual $H_2S$ contained in the solution can be removed in a preferred manner by an oxidizing treatment. For instance, if $CO_2$ gas is conducted in line 20, air at a restricted rate can be admixed thereto from line 22 so that the $CO_2$ contains about 20 volume ppm (parts per million) oxygen. In the lower portion of the regenerator 2, the oxygen is absorbed by the substantially regenerated solution and oxidizes the residual $H_2S$ in that solution. The thus regenerated solution can be used in the absorber 1 to desulfurize a gas to an $H_2S$ content below 0.1 ppm without an absorption of all $CO_2$ from the gas. Such gas is highly desired, e.g., as a synthesis gas for the synthesis of methanol.

It is not always necessary to cool the regenerated solution before it is fed to the absorber or the re-absorber. A solution which is at an elevated temperature because it has not been cooled will absorb less $CO_2$ and will have an even higher selectivity for the sulfur compounds.

EXAMPLE 2230 kmol/h of a gas for synthesis of methanol are desulfurized. The gas mainly contains CO and $H_2$ and also contains 6.8 Mol% of $CO_2$, 0.306 Mol% of $H_2S$ and 0.0347 Mol% of COS. In a process according to the drawing, the gas having a pressure of 53 bar and a temperature of 29° C. is fed into absorber 1 where it is scrubbed with an absorbent solution consisting of methanol and 7.5 Mol% of diethylamine. The scrubbed gas in line 8 has a temperature of 60° C., it still contains 3 Mol% of $CO_2$, 1.1 ppm $H_2S$ and 0.1 ppm COS.

The laden absorbent solution is fed via line 10 to re-absorber 3. A gas containing 59 Mol% of $H_2S$ and additionally $CO_2$ and COS is introduced into the re-absorber through line 16. From regenerator 2 through line 13, 38 m³/h of regenerated absorbent solution with a temperature of 25° C. are fed into re-absorber 3. The gas leaving the re-absorber through line 19 has a temperature of 64° C. It contains $CO_2$, some vaporous methanol and diethylamine and additionally 400 ppm $H_2S$ and 400 ppm COS.

In line 18 absorbent solution laden with $H_2S$ and COS is fed into regenerator 2 and at a pressure slightly above 1 bar said solution is regenerated therein at a temperature of about 76° C. A portion of the vapors rising in regenerator 2 are withdrawn via line 16; these vapors rich in $H_2S$ are cooled at 5 to about 40° C. and fed into re-absorber 3. The mixture of gases and vapors in line 14 is cooled at 4 to about 30° C. and condensate rich in $H_2S$ is recycled via line 15. The gas in line 23, 9.3 kmol/h, contains 73.4 Mol% $H_2S$, 8.2 Mol% COS and 8.7 Mol% $CO_2$. After removal of methanol and diethylamine from this gas in known manner, the gas is fed into a Claus plant for the production of elementary sulfur.

What is claimed is:

1. In a process of regenerating a laden absorbent solution used in an absorption zone to desulfurize a gas which contains $H_2S$ and $CO_2$ and possibly COS, said absorbent solution containing at least one highly volatile secondary amine in an organic solvent, wherein
   (A) said laden absorbent solution (first solution) withdrawn from said absorption zone and being laden with $H_2S$ and $CO_2$ and possibly COS is fed into a re-absorber at a first inlet, said re-absorber being a plate column, the pressure in said re-absorber being lower than in said absorption zone, feeding regenerated absorbent solution (second solution) at a second inlet into an upper portion of said re-absorber, said second inlet being above said first inlet, feeding a first gas rich in $CO_2$ and also containing $H_2S$ into said re-absorber at a third inlet below said first inlet, contacting said gas rising in said re-absorber countercurrent to said solutions from said first and second inlet, at the top of said re-absorber withdrawing a second gas consisting essentially of $CO_2$, and at the bottom of said re-absorber withdrawing a high-$H_2S$ content absorbent solution (third solution) having a higher $H_2S$ content than said first solution,
   (B) feeding said third solution into a regenerator at a fourth inlet at the upper portion of the regenerator, said regenerator being a plate column, indirectly heating the contents of the lower portion of said regenerator to produce vapors therein which rise upwardly in said regenerator, at the top of said regenerator at a first outlet withdrawing overhead vapors, cooling said overhead vapors to ambient temperature and separating a first condensate and a third gas, feeding said first condensate to the top of said regenerator at a fifth inlet, withdrawing said third gas having a high $H_2S$ content, at a second outlet withdrawing a stream of vapors from said regenerator, cooling said vapors to ambient temperature whereby to separate a second condensate and said first gas rich in $CO_2$, feeding said second condensate into said regenerator at a sixth inlet, said sixth inlet being 1 to 10 plates above said fourth inlet, said second outlet being 1 to 10 plates below said first outlet and said regenerator withdrawing regenerated absorbent solution, feeding a first partial stream of said regenerated absorbent solution to the top of said absorption zone and using a second partial stream of said regenerated absorbent solution as said second solution.

2. A process according to claim 1, wherein the absorbent solution contains N-methyl pyrrolidone, N-methyl $\epsilon$-caprolactam or another N-alkylated lactam as an organic solvent.

3. A process according to claim 1, wherein the absorbent solution contains one or more alkylated polyethylene glycol ethers as an organic solvent.

4. A process according to claim 1, wherein the absorbent solution contains tetrahydrothiophen-1,1-dioxide as an organic solvent.

5. A process according to claim 1, wherein diethyl amine, diisopropyl amine, methyl isopropyl amine, ethyl isopropyl amine, dipropyl amine, methyl n-butylamine, methyl isobutyl amine, methyl sec.butyl amine are used alone or in a mixture with each other as a secondary amine.

6. A process of regenerating according to claim 1, wherein liquid is withdrawn from the bottom of said regenerator, a portion thereof is reheated and the resulting vapors are returned to said regenerator through a seventh inlet, $CO_2$-containing absorbent solution and/or $CO_2$-containing gas is fed to the regenerator through an eighth inlet, said eighth inlet being below said second outlet and above said seventh inlet.

7. A process according to claim 6, wherein the $CO_2$-containing absorbent solution and/or the $CO_2$ gas is fed through said eighth inlet at the temperature in the regenerator and with such a $CO_2$ partial pressure that above the feeding level the absorbent solution which has not yet been entirely regenerated contains at least 0.1 mole of $CO_2$ per mole of secondary amine.

8. A process according to claim 6, wherein the $CO_2$-containing absorbent solution and/or the $CO_2$-containing gas is obtained by withdrawing a partial stream from the upper portion of said re-absorber.

9. A process according to claim 1, wherein residual $H_2S$ in the solution in the regenerator is removed by an oxidizing treatment.

10. A process according to claim 1, wherein an oxygen-containing gas is used for the oxidizing treatment.

11. A process according to claim 6, wherein air is added to a $CO_2$-containing gas obtained from an upper portion of said re-absorber and the mixture of air and $CO_2$-containing gas is fed to the regenerator through said eighth inlet whereby to oxidize $H_2S$ in said regenerator.

12. A process according to claim 1, wherein said first partial stream of regenerated absorption solution is fed into said absorption zone without being cooled.

13. A process according to claim 1, wherein the absorbent solution contains methanol or another monohydric alcohol as an organic solvent.

* * * * *

UNITED STATES PATENT AND TRADEMARK OFFICE
CERTIFICATE OF CORRECTION

PATENT NO. : 4,504,449

DATED : MARCH 12, 1985

INVENTOR(S) : ALEXANDER DOERGES et al

It is certified that error appears in the above-identified patent and that said Letters Patent is hereby corrected as shown below:

Column 7, line 52, after "outlet" insert a comma (,); change "and" to -- from --.

Signed and Sealed this

Fifth Day of November 1985

[SEAL]

Attest:

Attesting Officer

DONALD J. QUIGG

Commissioner of Patents and Trademarks